United States Patent
Greenspan et al.

(10) Patent No.: US 10,657,058 B2
(45) Date of Patent: May 19, 2020

(54) INTERLEAVED CACHE CONTROLLERS WITH SHARED METADATA AND RELATED DEVICES AND SYSTEMS

(71) Applicant: Intel Corporation, Santa Clara, CA (US)

(72) Inventors: Daniel Greenspan, Jerusalem (IL); Zvika Greenfield, Kfar Sava (IL)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 16/019,426

(22) Filed: Jun. 26, 2018

(65) Prior Publication Data

US 2019/0004953 A1   Jan. 3, 2019

Related U.S. Application Data

(63) Continuation of application No. 15/154,812, filed on May 13, 2016, now abandoned.

(51) Int. Cl.
*G06F 3/06* (2006.01)
*G06F 12/0846* (2016.01)
*G06F 12/0837* (2016.01)
*G06F 12/084* (2016.01)
*G06F 12/0895* (2016.01)

(52) U.S. Cl.
CPC .......... *G06F 12/0851* (2013.01); *G06F 3/061* (2013.01); *G06F 3/0605* (2013.01); *G06F 3/0658* (2013.01); *G06F 3/0683* (2013.01); *G06F 12/084* (2013.01); *G06F 12/0837* (2013.01); *G06F 12/0895* (2013.01); *G06F 2212/1016* (2013.01); *G06F 2212/221* (2013.01); *G06F 2212/283* (2013.01)

(58) Field of Classification Search
None
See application file for complete search history.

(56) References Cited

U.S. PATENT DOCUMENTS

| | | | |
|---|---|---|---|
| 2003/0159001 A1 | 8/2003 | Chalmer et al. | |
| 2012/0210069 A1 | 8/2012 | Bayer et al. | |
| 2013/0086331 A1 | 4/2013 | Konno et al. | |
| 2016/0335187 A1* | 11/2016 | Greenspan | G06F 12/0864 |

OTHER PUBLICATIONS

International search report for PCT Application No. PCT/US2017/027499 filed Apr. 13, 2017; dated Jul. 16, 2017; 11 pages.

* cited by examiner

*Primary Examiner* — Larry T Mackall
(74) *Attorney, Agent, or Firm* — Thorpe North & Western, LLP

(57) ABSTRACT

Interleaved cache controllers with shared metadata are disclosed and described. A memory system may comprise a plurality of cache controllers and a metadata store interconnected by a metadata store fabric. The metadata store receives information from at least one of the plurality of cache controllers, a portion of which is stored as shared distributed metadata. The metadata store provides shared access of the shared distributed metadata hosted to the plurality of cache controllers.

24 Claims, 11 Drawing Sheets

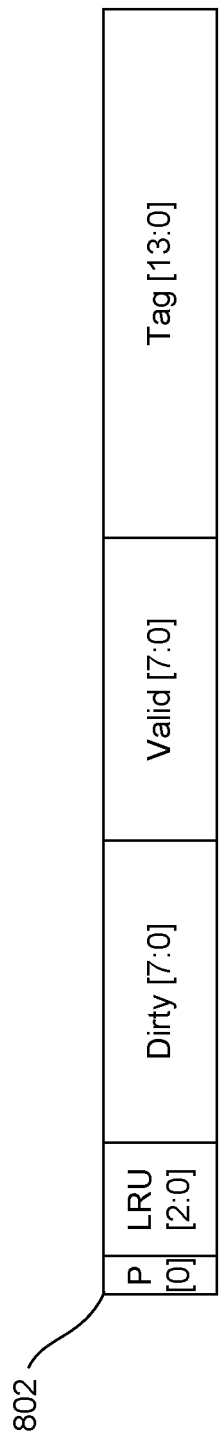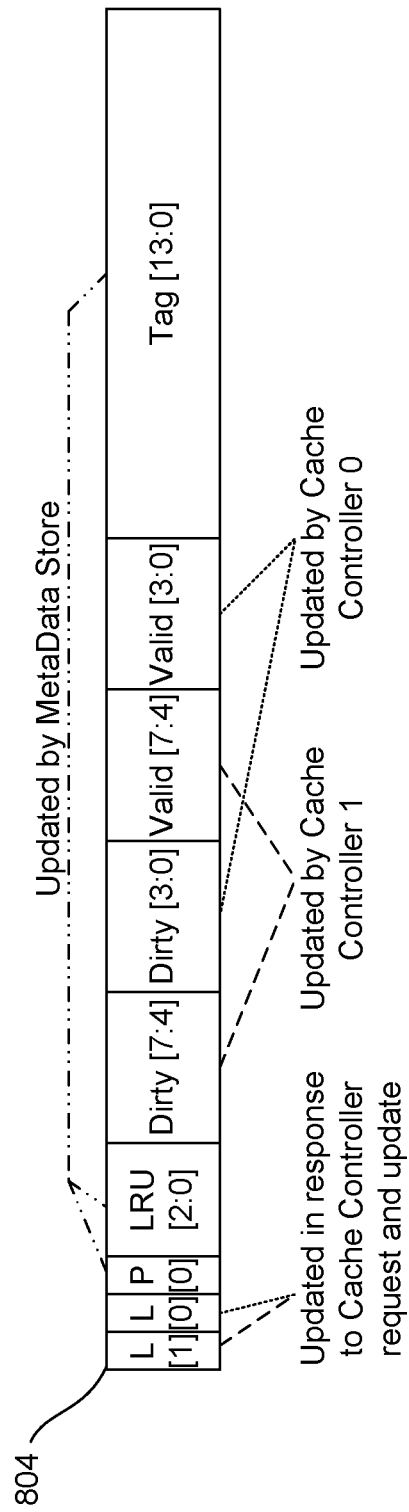

INTERLEAVED CACHE CONTROLLERS WITH SHARED METADATA AND RELATED DEVICES AND SYSTEMS

PRIORITY DATA

This application is a continuation of U.S. patent application Ser. No. 15/154,812, filed on May 13, 2016, which is incorporated herein by reference in its entirety.

BACKGROUND

Computer and electronic devices have become integral to the lives of many and include a wide range of uses from social media activity to intensive computational data analysis. Such devices can include smart phones, tablets, laptops, desktop computers, network servers, and the like. Memory systems and subsystems play an important role in the implementation of such devices, and are one of the key factors affecting performance. Accordingly, memory systems and subsystems are the subject of continual research and development.

BRIEF DESCRIPTION OF THE DRAWINGS

Features and advantages of the embodiments will be apparent from the detailed description which follows, taken in conjunction with the accompanying drawings, which together illustrate, by way of example, embodiment features; and, wherein:

FIG. 8A is a representation of an exemplary metadata entry;

FIG. 8B is a representation of an exemplary shared metadata entry;

Figure 1:
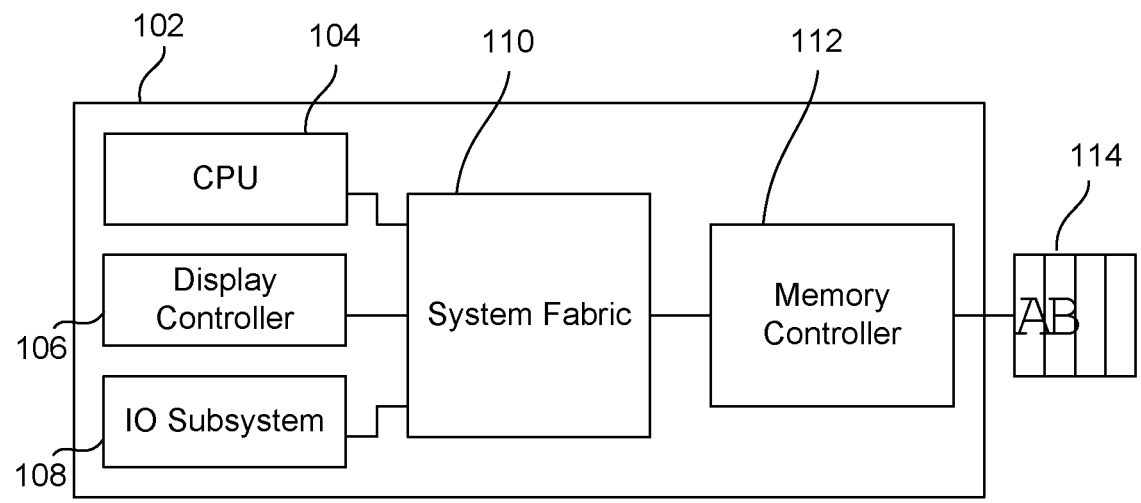
FIG. 1 is a schematic view of an exemplary memory system.

Reference will now be made to the exemplary embodiments illustrated, and specific language will be used herein to describe the same. It will nevertheless be understood that no limitation on invention scope is thereby intended.

DESCRIPTION OF EMBODIMENTS

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence. Furthermore, the described features, structures, or characteristics can be combined in any suitable manner in one or more embodiments.

Unless defined otherwise, all technical and scientific terms used herein have the same meaning as commonly understood by one of ordinary skill in the art to which this disclosure belongs.

As used in this written description, the singular forms "a," "an" and "the" include support for plural referents unless the context clearly dictates otherwise. Thus, for example, reference to "a bit line" includes support for a plurality of such bit lines.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of electrical or physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of electrical or physical connection or attachment between one item and another item where the items have at least one point of direct physical contact or otherwise touch one another. For example, when one layer of material is deposited on or against another layer of material, the layers can be said to be directly coupled.

Objects or structures described herein as being "adjacent to" each other may be in physical contact with each other, in close proximity to each other, or in the same general region or area as each other, as appropriate for the context in which the phrase is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of the embodiments is provided below and specific embodiments are then described in further detail. This initial summary is intended to aid readers in understanding the disclosure more quickly, but is not intended to identify key or essential technological features, nor is it intended to limit the scope of the claimed subject matter.

In computing, interleaved memory is a design made to compensate for the relatively slow speed of dynamic random-access memory (DRAM) memory, by spreading memory addresses evenly across memory channels. In this way, contiguous memory read and write operations use each memory channel in turn, resulting in higher memory throughputs. This is achieved by allowing memory channels to perform the desired operations in parallel, yet not forcing individual non-contiguous memory transactions into issuing the excessively large transactions that would result if the data bus to memory were to be merely widened. Memory systems, including one level (1LM) memory systems that implement high bandwidth using multiple memory controllers, such as DRAM, can interleave memory transactions between controllers.

An operating system (OS) allocates memory in chunks. For example, a program executing on the OS may request an allocation of memory for its data and the OS will provide this allocation as a non-sequential series of chunks of a specified size. The use of fixed-size chunks when allocating memory allows large allocations of memory to be made even where, as a result of continuous software operations, memory has become highly fragmented. In one embodiment, a typical OS will allocate memory in 4K bytes or chunks (4K Byte).

A system may implement a plurality of memory controllers to increase efficiency. However, it is not desirable that interleave granularity be 4K between memory controllers, as this may result in a read of an entire 4K chunk being serviced by only a single memory controller, and single memory channel. Therefore, requests can be interleaved at a size smaller than the size allocated by the OS. For example, requests for 256 bytes of data interleaved between controllers at 128 byte granularity can be serviced by more than one memory controller in parallel. Similarly, a request to read an entire 4K byte OS page could be serviced by multiple controllers in parallel.

A memory system with two cache controllers connected to two memory controllers may maintain tags within each cache controller for half-OS-pages rather than OS-pages, causing 100% size/cost impact for the large tag arrays. A different memory system may limit the interleave between cache controllers to OS page size, causing a 50% loss in stream bandwidth. A different memory system may, in addition to limiting the interleave between cache controllers to OS page size, add a memory fabric between cache controllers and memory controllers, causing a multi-cycle latency penalty.

One or more cache controllers may be implemented in memory systems to control local storage of cached data. In adapting such a system to include a memory-side cache, such as in a two level memory (2LM) system, bandwidth requirements typically necessitate the use of multiple cache controllers. The memory may store all the data but may be slow and therefore a portion of the data stored in the memory will be stored locally in the cache and managed by the cache controllers. In one embodiment, the cache controllers are capable of holding entries that relate to 4K byte of memory allocations, in line with the allocation granularity of an OS. The cache controllers may store data locally and hold the metadata on-die in a static random-access memory (SRAM) array to allow quick identification of the data stored locally. The cache controllers may store metadata that will typically include cache tags. Each cache controller has an upper limit of how many cache tags or pieces of metadata may be stored. Various embodiments provide a metadata store fabric that provides a plurality of cache controllers with shared access to a plurality of metadata stores. A metadata store fabric may be hardware that is a set of connections between metadata stores and cache controllers that allow an exchange of data between the metadata stores and the cache controllers.

From a metadata storage perspective, efficient implementation of a design with multiple cache controllers requires interleaving between the cache controllers at OS page granularity or greater. In one embodiment, reconciling this with the desire to interleave memory controllers as sub-OS page granularity may involve trade-offs in performance. Embodiments exemplified herein include memory devices, systems and methods that re-distribute storage and handling of memory-side cache metadata utilizing a mesh structure between multiple cache controllers and multiple metadata stores. The mesh structure may be a hardware structure and may also be referred to as a "metadata store fabric" or simply "fabric". The metadata stores may store the metadata or cache tags as shared distributed metadata. The shared distributed metadata allows a first cache controller to send information such as cache tags or metadata to a metadata store connected through the metadata store fabric. The metadata store then converts or stores the cache tag to a shared distributed metadata and provides a shared access to the shared distributed metadata allowing a second cache controller to access the shared distributed metadata that is based on the information from the first cache controller. This allows the second cache controller to carry out an operation based on cache tags or metadata without the need to allocate an additional metadata entry. Thus the second cache controller, or all of the cache controllers in the memory system, may be able to operate more efficiently at a higher bandwidth without increasing the capacity or size of the local store of the cache controller. For example, 256-byte requests being handled by two cache controllers in parallel and handled by two memory controllers in parallel. In one embodiment, the present disclosure utilizes tag and valid bits. The tags and valid bits are part of the metadata or shared distributed metadata that allow operations on the memory to occur. The shared distributed metadata also introduces lock bits that lock the shared distributed metadata until the lock bit is cleared by the associated cache controller. This ensures that the shared distributed metadata is not cleared from a metadata store before it is no longer needed for operations and possible update by a given cache controller. The mesh structure allows for efficient operation with OS-page-granularity cache entries, and hence metadata entries, in terms of metadata usage. The mesh also allows for efficient memory interleaving between cache controllers at sub-OS-page-size granularity in terms of optimized data path.

The use of metadata stores, metadata store fabric, and shared distributed metadata allow the data to flow through a cache controller without requiring the cache controller to locally store all metadata because it is being stored in the metadata store. In one embodiment, the present disclosure may be combined with various techniques to achieve zero additional latency for all cache hit transactions even when sub-page interleaving is used.

FIG. 1 shows a system-on-chip (SOC) 102 with a basic 1LM system. The SOC 102 includes a central processing unit (CPU) 104 for processing data in a computer system. It should be appreciated that CPU 104 may comprise integrated caches, not pictured, which are integrated into sub-systems of CPU 104. The SOC 102 also comprises an integrated display controller 106, a controller to control output data to a user being displayed on a display such as a screen. The SOC 102 additionally comprises an IO subsystem 108, which is an input output system for inputting and outputting data for system 102. The SOC 102 also comprises a system fabric 110, which can be a hardware fabric for connecting a memory controller 112 and other components of the SOC 102 together. The memory controller 112 is a dedicated hardware incorporated into the SOC 102 for controlling the memory 114. In one embodiment, the memory 114 is DRAM, but it should be appreciated that the memory 114 may be other types of memory as well. In one embodiment, FIG. 1 shows a 1LM system where the operating system employs a 4K Byte page and memory 114 has a 4K Byte page size. In one example, two adjacent OS-allocated pages of data, "A" and "B" are shown stored in memory 114 as shown. While the illustration of FIG. 1 shows a system-on-chip (SOC) 102, it may equally apply to a computer system built with more discrete components, for example where display controller 106 and an IO subsystem 108 are outside the boundary of element 102, and where element 102 represents a CPU with integrated system fabric 110 and memory controller 112.

Figure 2:
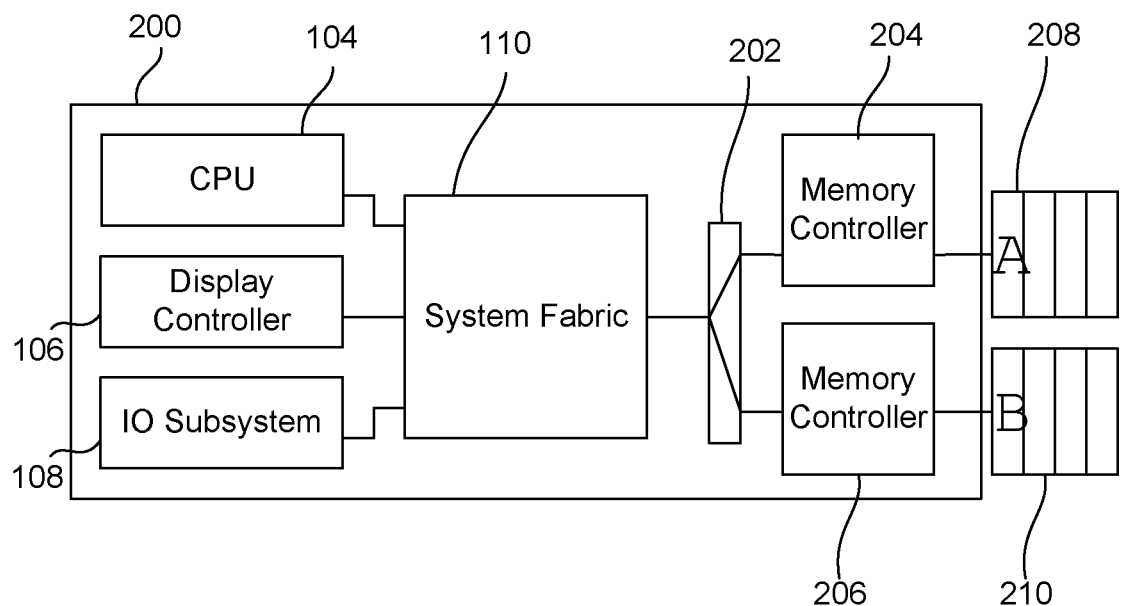
FIG. 2 is a schematic view of an exemplary memory system.

FIG. 2 shows a 1LM system with a SOC 200 that has multiple memory controllers. The SOC 200 may include some of the components of SOC 102. In one embodiment, the SOC 200 includes two memory controllers, specifically the memory controller 204 and the memory controller 206 that are connected to the system fabric 110 via a memory fabric 202. The memory fabric 202 is hardware configured to interleave across the two memory controllers as well as the memory 208 and the memory 210. For example, the interleave may occur every 4K bytes. In one configuration, when the system is reading from page A, only the memory controller 204 and the memory 208 are servicing the requests, and likewise, when it is reading from page B, only the memory controller 206 and the memory 210 are servicing the requests. Thus, although the memory controller and memory bandwidth has theoretically been doubled, the peak stream bandwidth of the system of FIG. 2 will remain little changed when compared to the system of FIG. 1.

Figure 3:
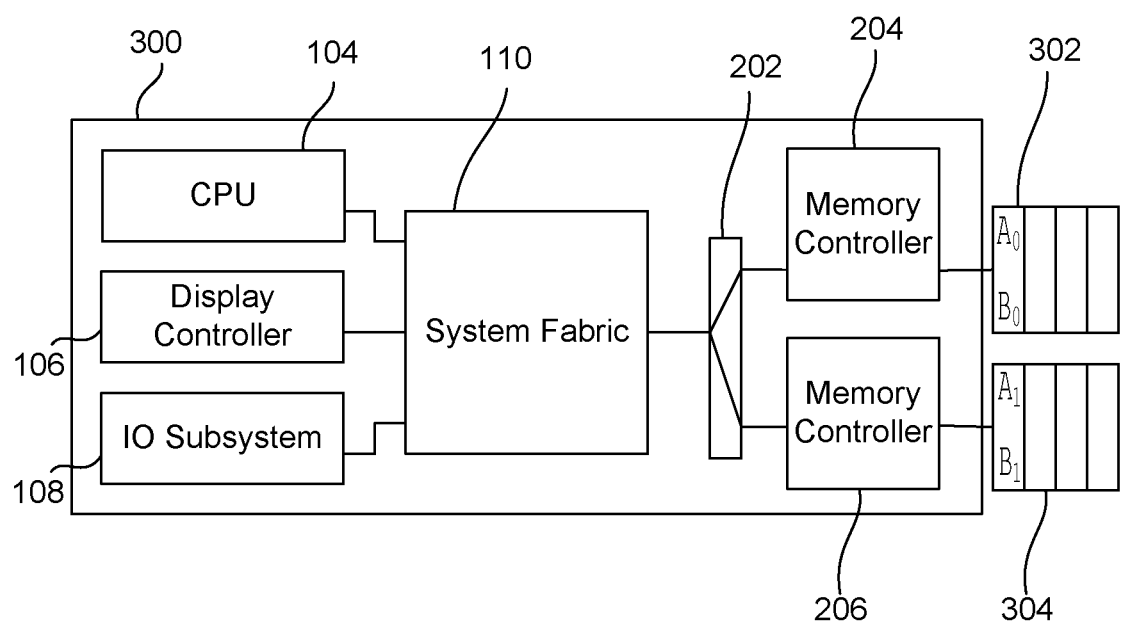
FIG. 3 is a schematic view of an exemplary memory system.

FIG. 3 shows a 1LM system with a SOC 300 that has multiple memory controllers. The SOC 300 may comprise some of the components of the SOC 102 and/or 200 and illustrates how the memory fabric 202 of SOC 200 may be configured differently in FIG. 3. In one embodiment, the SOCs 102, 200, and 300 depict examples where a SOC may issue multiple read requests simultaneously. However, the SOC 300 depicts embodiments that improve or optimize the performance 'stream bandwidth' where such multiple read requests exist. For example, the system may request to read 256 bytes, which may be one sixteenth of a memory page such as a DRAM page. In embodiments of system 300, each OS page has been sliced—such that A becomes $A_0$ and $A_1$. For example, $A_0$ contains data for bytes 0-127, 256-383, 512-639, 768-895, 1024-1151, 1280-1407, 1536-1663, 1792-1919, 2048-2175, 2304-2431, 2560-2687, 2816-2943, 3072-3199, 3328-3455, 3584-3711, 3840-3967 and $A_1$ contains data for bytes 128-255, 384-511, 640-767, 896-1023, 1152-1279, 1408-1535, 1664-1791, 1920-2047, 2176-2303, 2432-2559, 2688-2815, 2944-3071, 3200-3327, 3456-3583, 3712-3839, 3968-4095 within the page. Thus, a request to read 256 sequential bytes, such as from address 512 to address 767, will be serviced by both the memory controller 204 and the memory 302 (bytes 512-639) and the memory controller 206 and the memory 304 (bytes 640-767), realizing a doubling of bandwidth compared to the SOC 102 of FIG. 1.

Figure 4:
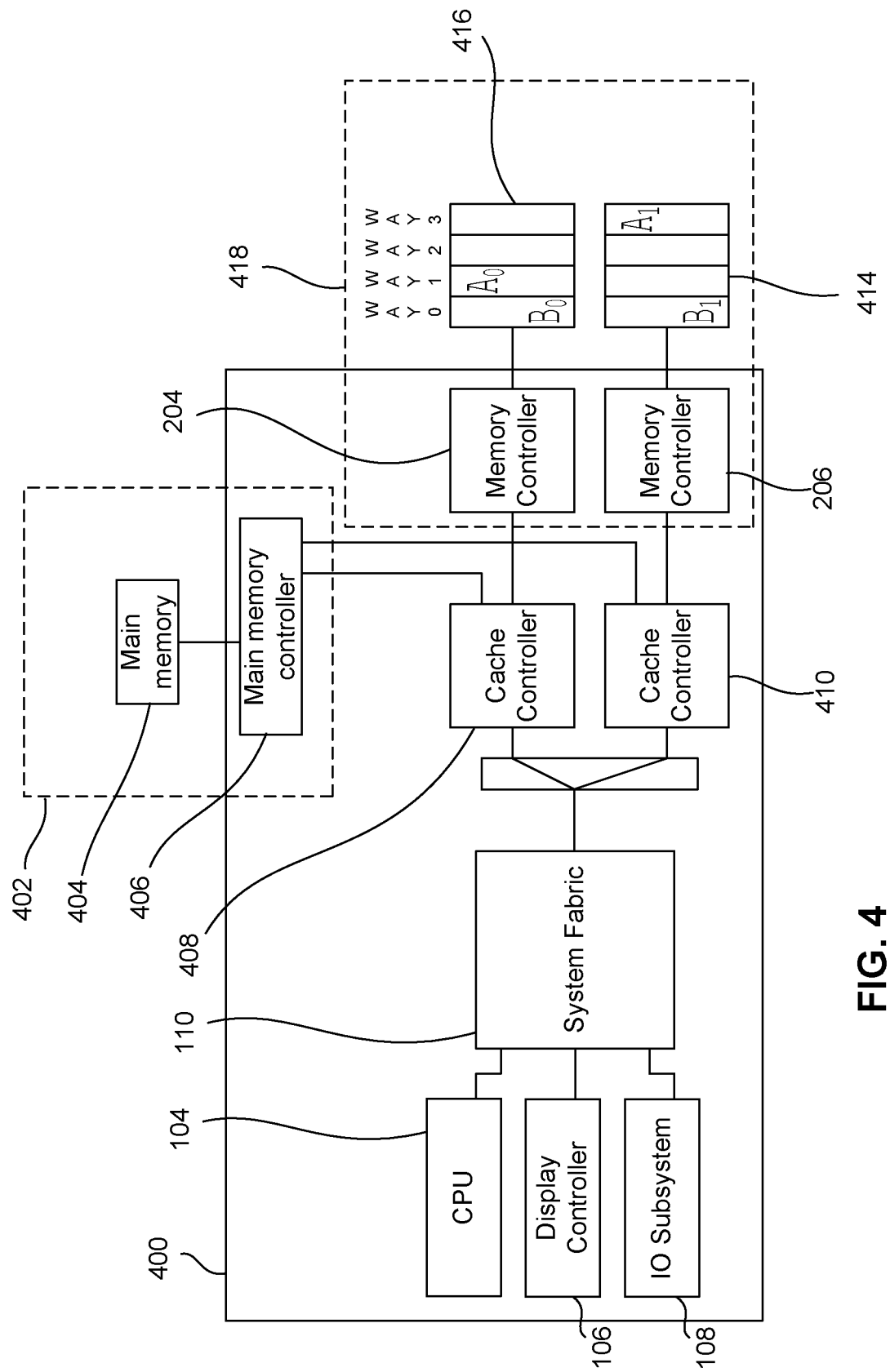
FIG. 4 is a schematic view of an exemplary memory system.

FIG. 4. shows a 2LM system with a SOC 400. The SOC 400 may include some of the components of the SOCs 102, 200, and/or 300. The SOC 400 depicts embodiments which further include a cache controller 408 and a cache controller 410 disposed between the system fabric 110 and the memory controller 204 and the memory controller 206 respectively. FIG. 4 depicts a memory 402 further comprising a memory 404 and SOC memory controller 406. The memory controller 406 is connected to the cache controller 408 and the cache controller 410. FIG. 4 also depicts a memory 418 comprising the memory 414 and memory 416 connected to SOC memory controller 204 and SOC memory controller 206 respectively. Memory 414 and 416 provide relatively fast data storage for the cache controller 408 and the cache controller 410, thereby allowing fast access to cached data of memory 404. The storage of pages A and B in the memory 414 and 416 may be similar to what is described in the system of FIG. 3. However, the position of the pages within each memory may be influenced by the organizational policies, such as the use of ways 0, 1, 2, 3, and 4, of the cache controller 408 and the cache controller 410.

In system SOC 400, separate arrays of cache tags (not shown) exist in each of the cache controller 408 and the cache controller 410 or are stored separate from cache controller 408 and the cache controller 410 but are accessible to cache controller 408 and the cache controller 410. The cache tags are references to which portions of the main memory 404 are held in which pages of the cache and are maintained by each cache controller. Thus, for a single OS page "in use" such as A, there is a double overhead of assigning, storing, looking-up, and maintaining tags where the cache controller 408 is for maintaining the tag for $A_0$ and the cache controller 410 is for maintaining the tag for $A_1$. One design approach to avoid this double overhead is to use a single cache controller. However, in many cases, due to bus throughput or other scaling issues, memory controller location, or the integration of the memory controller/cache controller fabric into the system fabric, this approach of only a single cache controller is impractical. Thus in a practical system, multiple cache controllers are matched to multiple memory controllers. Another approach to solving the double tag problem of the system shown in FIG. 4 is the system of FIG. 5.

Figure 5:
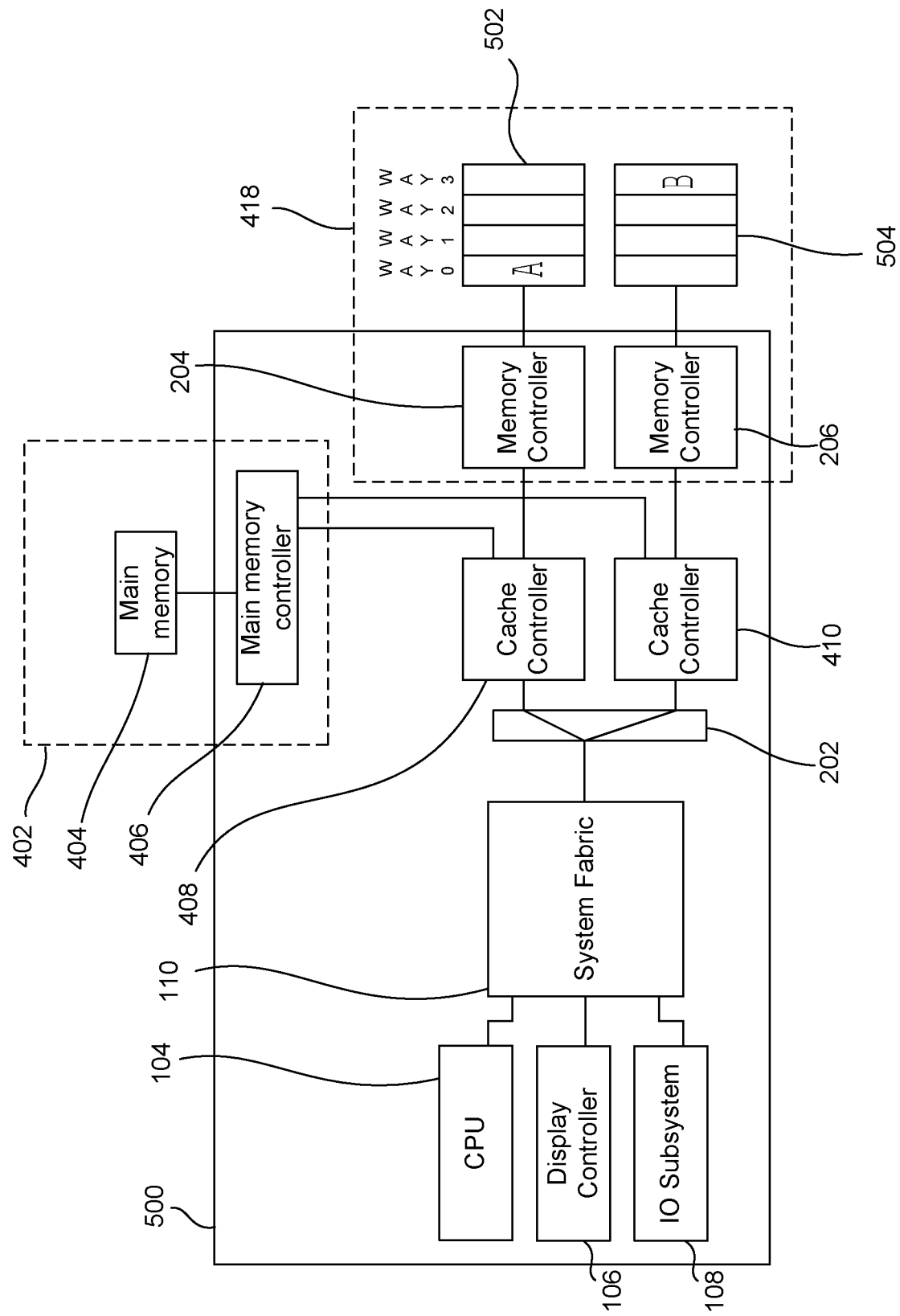
FIG. 5 is a schematic view of an exemplary memory system.

FIG. 5 shows a 2LM system with a SOC 500. The SOC 500 may comprise some of the components of the SOCs 102, 200, 300, and/or 400. The SOC 500 depicts a larger interleave between the two cache controllers (for example 4K Byte) as compared to the SOC 400 of FIG. 4, such that an entire OS page is handled by a single cache controller. However, this large interleave causes the bandwidth limitations similar to the SOC 200 of FIG. 2, as only one memory controller handles each OS page.

Figure 6:
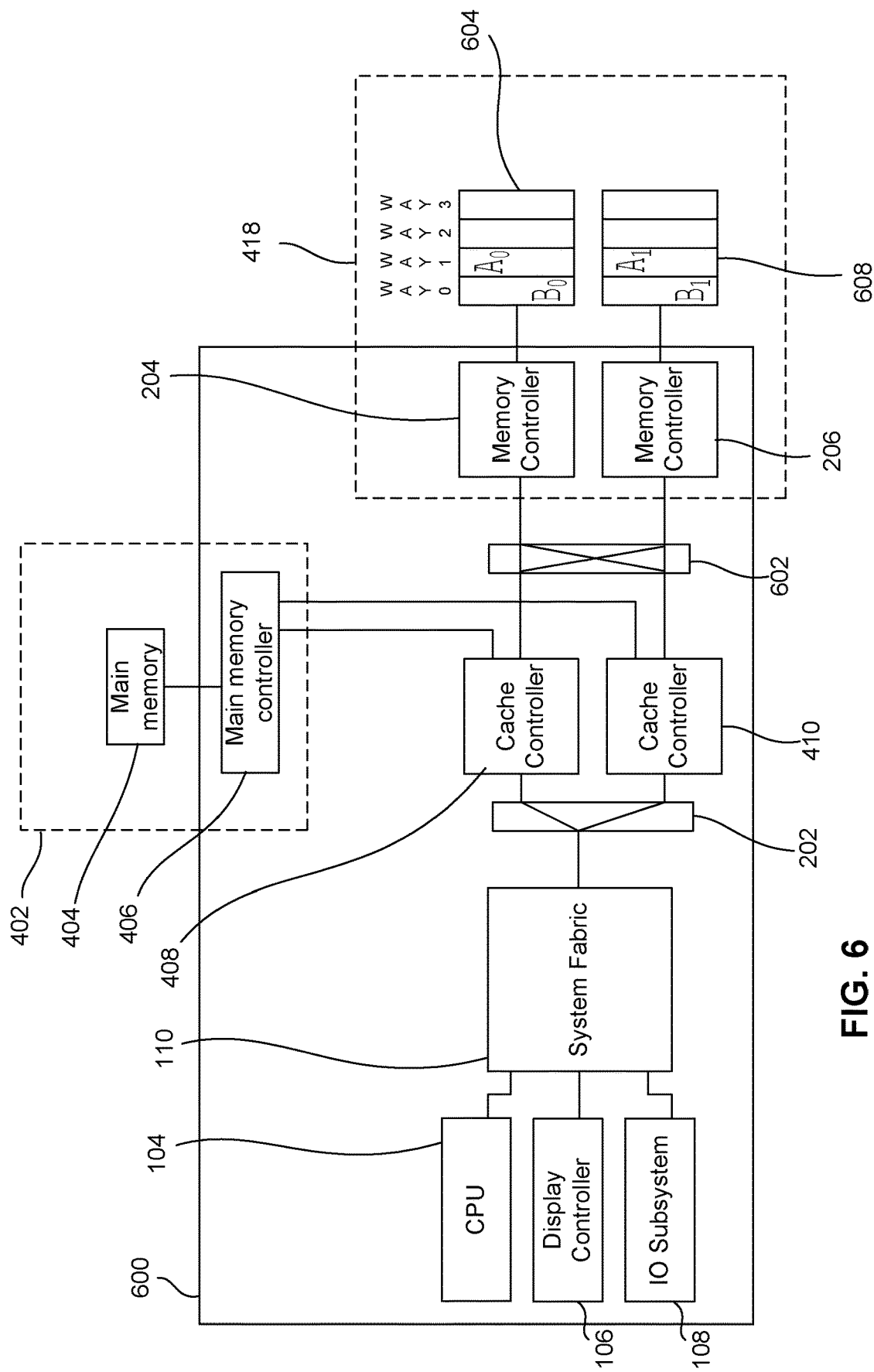
FIG. 6 is a schematic view of an exemplary memory system.

FIG. 6 shows a 2LM system with a SOC 600. The SOC 600 may comprise some of the components of the SOCs 102, 200, 300, 400, and/or 500. The SOC 600 connects to the memory 604 and memory 608. The SOC 600 depicts an additional fabric, a memory fabric 602, which is disposed between the cache controllers 408 and 410 and the memory controllers 204 and 206. Memory fabric 602 provides interleaving at the memory with sub-OS-page granularity (for example, 128 bytes or other values), while still allowing the cache controllers to be interleaved by memory fabric 202 at OS-page granularity (for example 4K Byte). However, there is the added latency impact of the memory fabric 602, and the desire that individual cache controllers each be capable of handling the full bandwidth of both memory controllers.

Figure 7A:
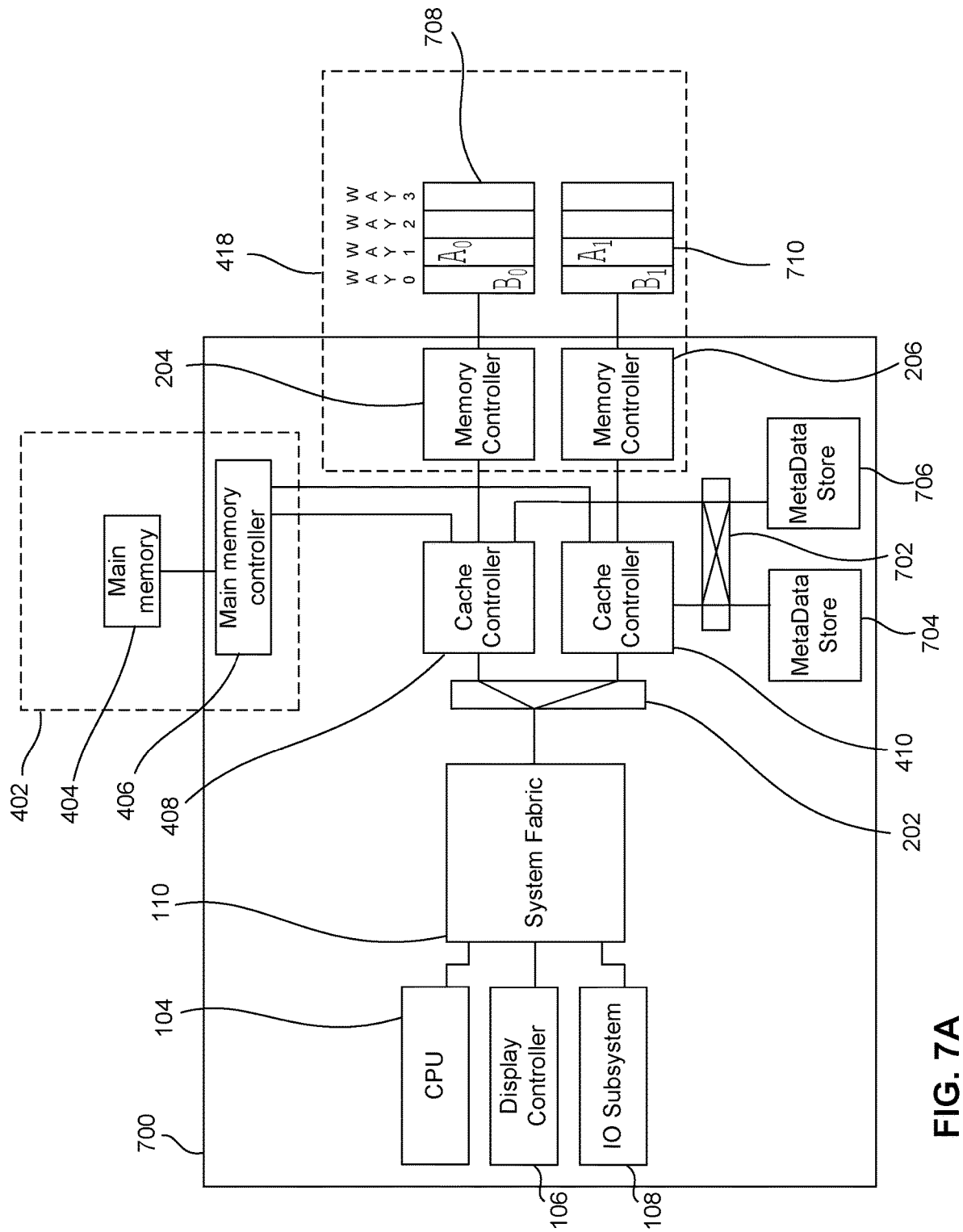
FIG. 7A is a schematic view of an exemplary memory system.

FIG. 7A, shows a 2LM system with a SOC 700 in accordance with various embodiments. The SOC 700 may comprise some of the components of the SOCs 102, 200, 300, 400, 500, and/or 600. The SOC 700 depicts embodiments of the present disclosure that may overcome at least some of the described limitations of the SOCs 400, 500, and/or 600. The SOC 700 depicts a metadata store fabric 702, a metadata store 704, and a metadata store 706. FIG. 7A further depicts SOC 700 connected to memories 708 and 710. In one embodiment, the metadata stores 704 and 706 are on-die metadata storage blocks that service the cache controllers, but are separated from the cache controllers and each serve a multiplicity of cache controllers. In one embodiment, the metadata store is a static random-access memory (SRAM) array. In other words, metadata storage is extracted out or away from the cache controllers with the implementation of the metadata stores. Each metadata store may serve a multiplicity of the cache controllers in the SOC 700. In one embodiment, the metadata stores 704 and 706 are assembled as separate metadata storages but can be implemented in the same or different memory devices. It should be appreciated that the SOC 700 depicts two cache controllers and two metadata stores, but any number or combination of cache controllers and metadata stores can be used. In a given SOC for example, the number of cache controllers may be greater than the number of metadata stores, the number of metadata stores may be greater than the number of cache controllers, or the system may include only one metadata store for a plurality of cache controllers.

In one embodiment, within each metadata store, a logic block is added that is assigned responsibility for some of the tasks that would generally be assigned to a cache controller.

For example, these tasks may include maintaining least recently used (LRU) indications, and re-allocating the clean entry with the highest LRU when a cache allocation to a new system memory address is required. Various embodiments may achieve the same interleave as shown in the SOC 600 of FIG. 6, but without the latency and wide data paths of the memory fabric. The additional latency of the metadata store fabric may be mitigated by the use of various techniques. For example, identically-offset fragments of the pages stored in multiple ways of a cache set are stored together in a single DRAM page, facilitating the ability of the memory controller to issue the DRAM page open requests on the assumption that the requested data will be found in the cache, but prior to knowing in which way it is to be found.

Figure 7B:
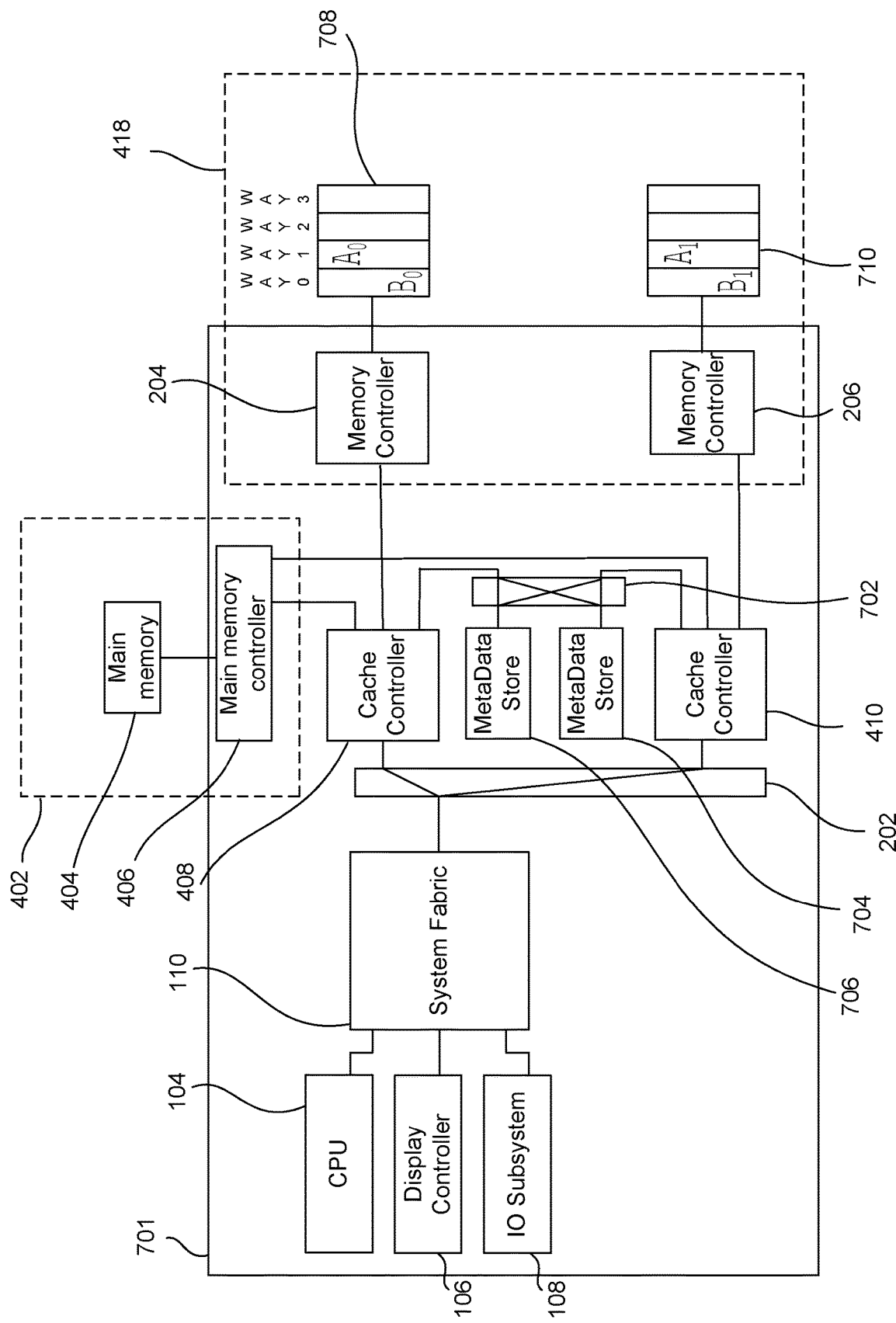
FIG. 7B is a schematic view of an exemplary memory system.

FIG. 7B shows a 2LM system with a SOC 701 upon which embodiments of the present disclosure are implemented. The SOC 701 may be described as an alternate configuration of SOC 700 of FIG. 7A. For example, the metadata stores 704 and 706 in SOC 701 are each physically co-located with the cache controllers 408 and 410 respectively. Despite the physical proximity of metadata stores 704 and 706 to the cache controllers 408 and 410, the presence of the metadata store fabric 702 allows the metadata stores 704 and 706 to logically operate in a similar manner to what was described for SOC 700 of FIG. 7A. For example, FIG. 7B depicts different locations of the metadata stores 704 and 706 relative to the locations of the metadata stores 704 and 706 for FIG. 7A. However, these different locations of the metadata stores 704 and 706 need not affect the general connectivity of the metadata stores 704 and 706 to the cache controllers 408 and 410 for the described operations. It should be appreciated that the physical proximity of each metadata store to a cache controller may allow simplified construction of derivative designs, for example a 'chopped' derivative containing only one cache controller, one metadata store, and one memory controller, or a 'high-end' derivative containing four cache controllers, four metadata stores, and four memory controllers.

Figure 7C:
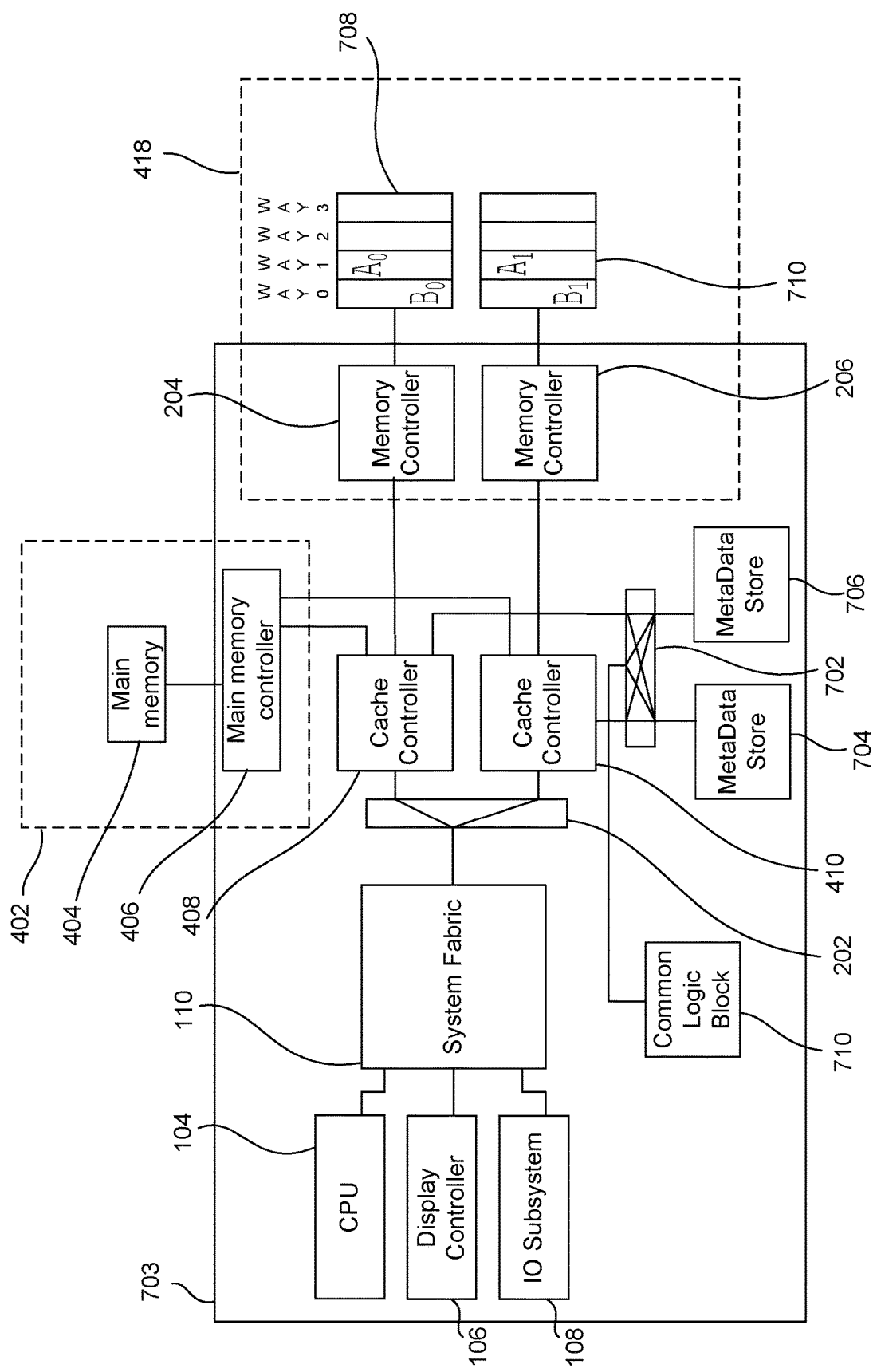
FIG. 7C is a schematic view of an exemplary memory system.

FIG. 7C shows a 2LM system with a SOC 703 upon which embodiments of the present disclosure are implemented. SOC 703 is an alternate configuration of the SOC 700 of FIG. 7A or SOC 701 of FIG. 7C. The system 703 further comprises the common logic block 710. In one embodiment, the common logic block 710 is a logic block connected with the metadata store fabric 702. The common logic block 710 is added to SOC 703 so that each of the metadata stores are not required to comprise their own logic block that is responsible for tasks. For example, these tasks may include scrubbing, maintaining least recently used (LRU) indications, and re-allocating the clean entry with the highest LRU when a cache allocation to a new system memory address is required. For example, the tasks may be tasks that would be assigned to the cache controller, but instead are executed by common logic block 710 operations on the metadata stores. In one embodiment, FIGS. 7A-C of the present disclosure depict the development of a "shared metadata entry" that allows cache controllers to each access shared, distributed metadata without the risk of corrupting metadata used by the other cache controllers sharing that metadata entry.

FIG. 8A is a representation of one type of a standard metadata entry. For example, a metadata 802 is a standard or typical metadata entry and may be used in a set-associative sectored cache. In one embodiment, the metadata 802 employs fourteen tag bits for address matching. In such an embodiment, eight valid bits each report on the validity of 512 bytes of data of that entry. Likewise, eight dirty bits indicate whether the data must be scrubbed to main memory before the entry is re-allocated. Three LRU bits track order of use (in relation to other entries of the same cache set), and one Pinned "P" bit captures software has requested that the entry not be re-allocated.

FIG. 8B depicts shared metadata entry 804 which may be shared metadata entry among cache controllers as employed by embodiments of the present disclosure. A division of "valid" and "dirty" bits occurs according to each controller. For example, valid[3:0] may refer to bytes 0-127, 256-383, 512-639 and 768-895, all of which may be handled by cache controller 408 of FIG. 7A. Additionally, valid[7:4] may refer to bytes 128-255, 384-511, 640-767, and 896-1023, all of which may be handled by cache controller 410 of FIG. 7A. "Lock" bits are included for each cache controller. It should be appreciated that "lock" bits relate to the valid and dirty bits of a given cache controller. For example, lock 0 (depicted as L[0]) would relate to valid[3:0] and dirty[3:0] for cache controller 408 of FIG. 7A. Lock 1 (depicted as L[1]) would relate to valid[7:4] and dirty[7:4] for cache controller 410 of FIG. 7A. For example, an assertion of a "lock" bit indicates that the respective controller has taken a local copy of its "dirty" and "valid" bits for that entry, and that these should not be changed except by that cache controller.

In one embodiment, the shared metadata entry 804 may be further enhanced by the addition of a lock bit related to the common logic block 710 of FIG. 7C. Such a lock bit is not strictly needed but may be optionally added. An additional lock bit L[2] (not depicted) may be added to the metadata entry 804. The additional lock bit L[2] may force the metadata store to know to request that the common logic block 710 completed its task and released this lock prior to giving the metadata from the metadata store to the requesting cache controller.

In one embodiment of a system with multiple cache controllers, any entry, which is not in use by any controller, will have its "lock" bits clear. The metadata store is free to initiate scrub of the dirty data for that entry, and, for clean entries, re-allocate at will. For example, a re-allocation may occur according to an least recently used (LRU) protocol or other algorithm. When one of the cache controllers receives a transaction to a memory address, it sends a request to the appropriate metadata store to check the appropriate tags for a match (indicating that this memory address has been allocated in the cache), such tags are common to the cache controllers. If a match is found, a copy of the contents of that entry is delivered by the metadata store to the requesting cache controller and the lock bit pertaining to the requesting cache controller is set in the entry at the metadata store. In such an embodiment, the copy of the contents delivered to the requesting cache controller need not include valid or dirty bits belonging to one of the other controllers. The receiving cache controller serves that transaction as well as any further ones to the other parts of same OS page that are assigned to it due to the chosen interleave. In one embodiment, the cache controller may update the values of its local copy of the "valid" and "dirty" bits for that entry to reflect the cache operations it has performed. In one embodiment, when the cache controller has completed handling all transactions relating to this entry, it will send an update to the metadata store of the appropriate "valid" and "dirty" bits for that cache controller. In one embodiment, the receipt of this update causes the lock bit for the requesting cache controller to be cleared in the entry at the metadata store.

By virtue of the assignment shown for shared metadata entry 804 regarding which parts of the "valid" and "dirty" fields may be updated by a given cache controller, avoids the problem of stale metadata belonging to one cache controller being written as part of an update by one of the other cache controllers. Such a mechanism allows multiple cache controllers independently and simultaneously, with no synchronization or communication between them, to access and update a single shared metadata entry, without risk of corrupting the "valid" or "dirty" bits relating to data of the entry handled by one of the other cache controllers because the shared meta data entry is locked.

In one embodiment, once the "lock" bits are clear, the metadata store will again be able to perform scrubbing and re-allocation of entries. As one approach to prevent deadlock cases, the metadata store may also have a mechanism or protocol to instruct a cache controller to send its update in order to release the lock bit.

In reference to tasks and metadata entries in metadata stores, scrubbing is the process of taking a 'dirty' cache data entry (i.e., one that contains newer data than the main memory) and making it 'clean' (i.e., containing the same data as main memory). Conversely, a 'clean' cache data entry may become 'dirty' as a result of a write command with new data being received from the CPU. Scrubbing is accomplished by copying the data from the cache to the main memory, which results in the data of both cache and main memory being once again identical, hence this cache data entry can now be considered 'clean'.

In one embodiment, scrubbing dirty cache data while a lock bit for that entry is set may be possible, provided that the cache controller that set the lock bit indicates to the metadata store whether additional writes were received to that data while the entry was "locked". For example, this may be because the cache controller has taken a local copy of its "dirty" and "valid" bits for that entry. It is sufficient for a cache controller to notify a metadata store whether additional writes (for example from the CPU) were received to cache data that was already dirty to allow the metadata store to decide whether entry that was scrubbed while 'locked' may remain clean (if no additional writes were received, and thus cache data is the same data as main memory), or should be dirty (if additional writes were received and written to the cache data, cache data is not expected to be the same data as main memory).

In one embodiment, when serving transaction requests from an agent that may be expected to access a stream of data, the metadata store may choose to pro-actively send metadata also to cache controller(s) that did not request it, and to set the appropriate lock bit. For example, the stream of data may be a display controller streaming data to the display as advised to the metadata store by the cache controller.

The non-requesting cache controllers may then match incoming cache access requests against the metadata and know not to send a metadata request to the metadata store because they already have the results for such a metadata request. This will allow those controllers to be prepared should they receive a request to the same OS page as was requested in the initial request.

In one embodiment, logic of the metadata store could request that the cache controllers perform the scrubbing. For example, the logic of the metadata store could send a request to the cache controller to write the cache data for a particular entry to main memory and notify the metadata store when that was done. In another embodiment, the metadata store may read the data cached by the cache controllers from the memory accessed by the memory controllers, either directly or via request to the cache controllers, and write this to main memory. This may be done directly by the metadata store sending requests to the memory controllers (either directly, or by sending requests to the cache controllers to be forwarded to the memory controllers) and receiving data from the memory controllers (either directly, or by the memory controllers sending data to the cache controllers which in turn would send it to the metadata store for reception) and, having received that data from the memory controller, writing it to main memory.

Figure 9:
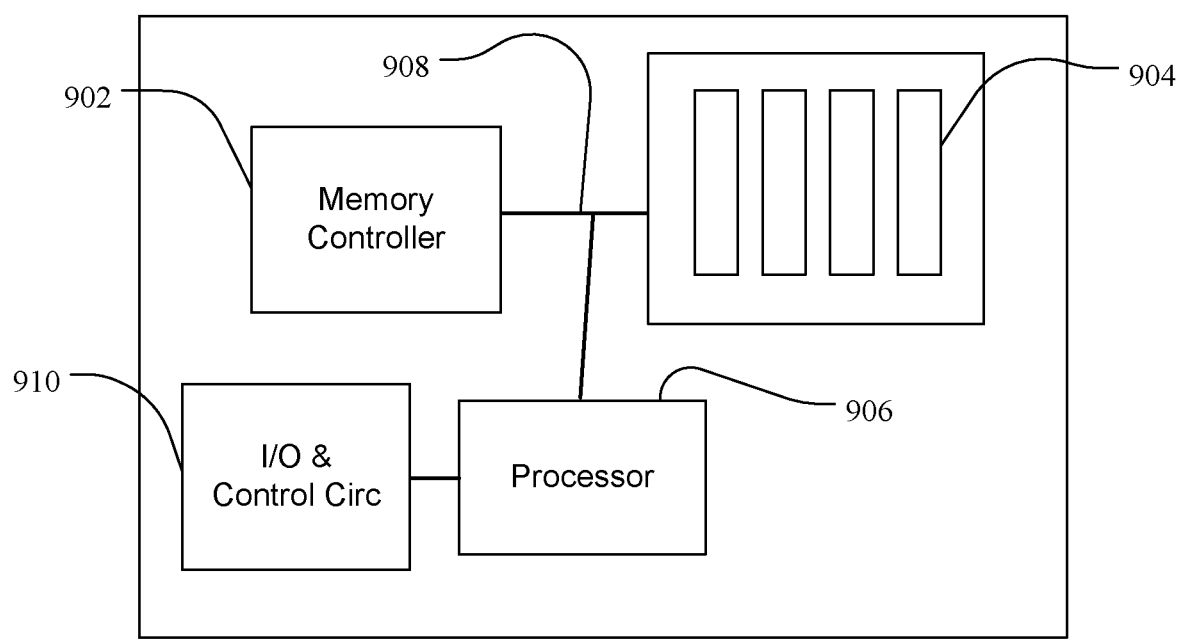
FIG. 9 is a schematic view of an exemplary system.

FIG. 9 depicts an exemplary system upon which embodiments of the present disclosure may be implemented. For example, the system of FIG. 9 may be a computer system. The system can include a memory controller 902, a plurality of memory 904, a processor 906, and circuitry 908. The circuitry can be configured to implement the hardware described herein for system 700, 701, and/or 703 of FIG. 7A-C. Various embodiments of such systems for FIG. 9 can include smart phones, laptop computers, handheld and tablet devices, CPU systems, SoC systems, server systems, networking systems, storage systems, high capacity memory systems, or any other computational system.

The system can also include an I/O (input/output) interface 910 for controlling the I/O functions of the system, as well as for I/O connectivity to devices outside of the system. A network interface can also be included for network connectivity, either as a separate interface or as part of the I/O interface 910. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to memory 904 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 906 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

Although not depicted, any system can include and use a power supply such as but not limited to a battery, AC-DC converter at least to receive alternating current and supply direct current, renewable energy source (e.g., solar power or motion based power), or the like.

The disclosed embodiments may be implemented, in some cases, in hardware, firmware, software, or any combination thereof. Portions of the disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Reference to storage, stores, memory, or memory devices can refer to memory whose state is in-determinate if power is interrupted to the device (e.g., DRAM) or to memory devices whose state is determinate even if power is interrupted to the device. In one embodiment, such an additional memory device can comprise a block addressable mode memory device, such as planar or multi-dimensional NAND or NOR technologies, or more specifically, multi-threshold level NAND flash memory, NOR flash memory, and the like. A memory device can also include a byte-addressable three dimensional crosspoint memory device, or other byte addressable write-in-place nonvolatile memory devices, such as single or multi-level Phase Change Memory (PCM), memory devices that use chalcogenide phase change material (e.g., chalcogenide glass), resistive memory, nanowire memory, ferroelectric transistor random access memory (FeTRAM), magnetoresistive random access memory (MRAM) memory that incorporates memristor technology, or spin transfer torque (STT)-MRAM.

Figure 10:
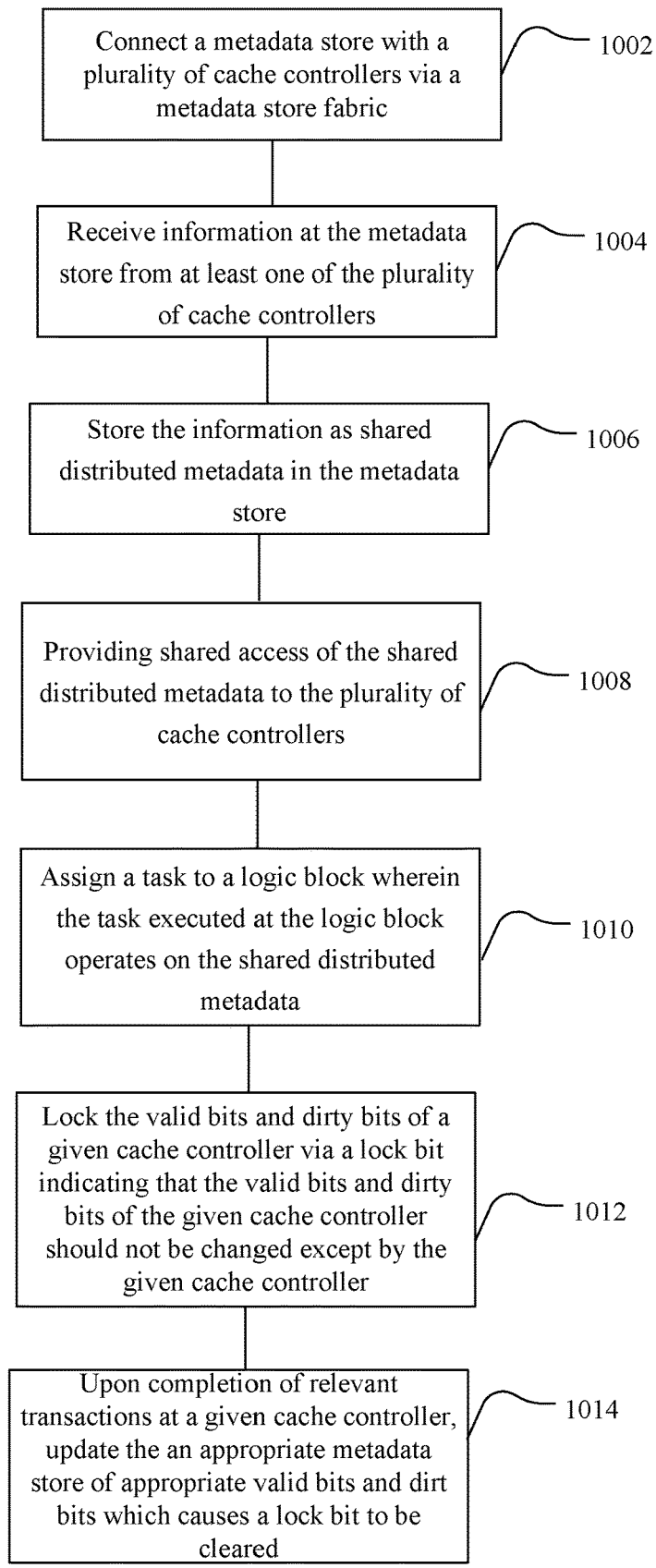
FIG. 10 is a representation of steps of an exemplary method of a memory system with shared metadata.

FIG. 10 depicts a flowchart of a method for sharing metadata and metadata stores. The method can be executed as instructions on a machine, where the instructions are included on at least one computer readable medium or one non-transitory machine-readable storage medium. In one embodiment, the circuitry 908 of FIG. 9 is configured to carry out the steps of FIG. 10. Moreover, the systems depicted in FIGS. 7A-C may be employed to carry out the steps of FIG. 10. The method can include the operation of: connect a metadata store with a plurality of cache controllers via a metadata store fabric, as in block 1002. The method can include the operation of: receive information at the metadata store from at least one of the plurality of cache controllers, as in block 1004. The method can include the operation of: store the information as shared distributed metadata in the metadata store, as in block 1006. The method can include the operation of: providing shared access of the shared distributed metadata to the plurality of cache controllers, as in block 1008. The method can include the operation of: assign a task to a logic block wherein the task executed at the logic block operates on the shared distributed metadata, as in block 1010. The method can include the operation of: lock the valid bits and dirty bits of a given cache controller via a lock bit indicating that the valid bits and dirty bits of the given cache controller should not be changed except by the given cache controller, as in block 1012. The method can include the operation of: upon completion of relevant transactions at a given cache controller, update the appropriate metadata store of appropriate valid bits and dirty bits which causes a lock bit to be cleared, as in block 1014. It should be appreciated that the steps of FIG. 10 may not include all of the steps depicted nor in the order in which they are depicted.

Examples

The following examples pertain to specific embodiments and point out specific features, elements, or steps that can be used or otherwise combined in achieving such embodiments.

In one example, there is provided, a memory system, comprising:
a plurality of cache controllers with circuitry configured to:
    access memory controllers which access memory;
    a metadata store in communication with the at least one cache controller with circuitry configured to:
    receive information from at least one of the plurality of cache controllers, a portion of which is stored as shared distributed metadata;
    provide shared access of the shared distributed metadata hosted to the plurality of cache controllers; and
    a metadata store fabric disposed between the plurality of cache controllers and the at least one metadata store to facilitate the shared access.

In one example of a memory system, the information is related to a task assigned to one of the plurality of cache controllers.

In one example of a memory system, the metadata store fabric further comprises a common logic block to manage the task assigned to one of the plurality of cache controllers.

In one example of a memory system, the metadata store further comprises a logic block to manage the task assigned to one of the plurality of cache controllers.

In one example of a memory system, the metadata store is one of a plurality of metadata stores.

In one example of a memory system, the metadata store is one of a plurality of metadata stores and the number of the plurality of metadata stores corresponds to the number of the plurality of cache controllers.

In one example of a memory system, the metadata store is one of a plurality of metadata stores and the number of the plurality of metadata stores is greater than the number of the plurality of cache controllers.

In one example of a memory system, the metadata store is a static random-access memory (SRAM) array.

In one example of a memory system, one of the tasks assigned to the metadata store comprises maintaining least recently used (LRU) indications.

In one example of a memory system, one of the tasks assigned to the metadata store comprises re-allocating an entry based on the least recently used (LRU) indication when a new system memory address is to be cached.

In one example of a memory system, the shared distributed metadata hosted by the metadata store comprises valid bits and dirty bits.

In one example of a memory system, the shared distributed metadata hosted by the metadata store comprises lock bits pertaining to the plurality of cache controllers.

In one example of a memory system, a lock bit is to assert that the valid bits and dirty bits of a given cache controller are locked and are not changed except by the given cache controller.

In one example of a memory system, one of the plurality of cache controllers, upon completion of all transactions relating to a metadata entry, is to update the metadata store of appropriate valid bits and dirty bits and cause a lock bit to be cleared.

In one example of a memory system, a logic block is configured to identify dirty entries for a scrubbing operation wherein the logic block is associated with the metadata store fabric or the metadata store.

In one example, there is provided, a system, comprising:
one or more processors configured to process data;
an input output subsystem configured to receive input data and to output data;
a plurality of memory controllers to access a plurality of memory;
a plurality of cache controllers with circuitry configured to:
    access memory controllers which access memory;
    a cache controller fabric disposed between the system fabric and the plurality of cache controllers;
    a metadata store in communication with the plurality of cache controllers with circuitry configured to:

receive information from at least one of the plurality of cache controllers, a portion of which is stored as shared distributed metadata;

provide shared access of the shared distributed metadata hosted to the plurality of cache controllers;

a metadata store fabric disposed between the plurality of cache controllers and the plurality of metadata stores; and a system fabric configured to connect the one or more processors and the input output subsystem to the plurality of memory controllers and the plurality of cache controllers.

In one example of a system, the information is related to a task assigned to one of the plurality of cache controllers.

In one example of a system, the metadata store fabric further comprises a common logic block to manage the task assigned to one of the plurality of cache controllers.

In one example of a system, the metadata store further comprises a logic block to manage the task assigned to one of the plurality of cache controllers.

In one example of a system, the metadata store is one of a plurality of metadata stores.

In one example of a system, the metadata store is one of a plurality of metadata stores and the number of the plurality of metadata stores corresponds to the number of the plurality of cache controllers.

In one example of a system, the metadata store is one of a plurality of metadata stores and the number of the plurality of metadata stores is greater than the number of the plurality of cache controllers.

In one example of a system, the metadata store is a static random-access memory (SRAM) array.

In one example of a system, one of the tasks assigned to the metadata store comprises maintaining least recently used (LRU) indications.

In one example of a system, one of the tasks assigned to the metadata store comprises re-allocating an entry based on the least recently used (LRU) indication when a new system memory address is to be cached.

In one example of a system, the shared distributed metadata hosted by the metadata store comprises valid bits and dirty bits.

In one example of a system, the shared distributed metadata hosted by the metadata store comprises lock bits pertaining to the plurality of cache controllers.

In one example of a system, a lock bit is to assert that the valid bits and dirty bits of a given cache controller are locked and are not changed except by the given cache controller.

In one example of a system, one of the plurality of cache controllers, upon completion of all transactions relating to a metadata entry, is to update the metadata store of appropriate valid bits and dirty bits and cause a lock bit to be cleared.

In one example of a system, a logic block is configured to identify dirty entries for a scrubbing operation wherein the logic block is associated with the metadata store fabric or the metadata store.

In one example, there is provided, a method comprising:
connecting a metadata store with a plurality of cache controllers via a metadata store fabric;
receiving information at the metadata store from at least one of the plurality of cache controllers;
storing the information as shared distributed metadata in the metadata store;
providing shared access of the shared distributed metadata to the plurality of cache controllers; and
assigning a task to a logic block wherein the task executed at the logic block operates on the shared distributed metadata.

In one example of a method, the metadata store is one of a plurality of metadata stores.

In one example of a method, the plurality of cache controllers and the metadata store are interconnected via a metadata store fabric.

In one example of a method, the metadata store fabric comprises a common logic block to manage the task assigned to one of the plurality of cache controllers.

In one example of a method, the metadata store further comprises a logic block to manage the task assigned to one of the plurality of cache controllers.

In one example of a method, the metadata store is a static random-access memory (SRAM) array.

In one example of a method, the task assigned to the metadata store comprises maintaining least recently used (LRU) indications.

In one example of a method, the task assigned to the metadata store comprises re-allocating a clean entry with a higher least recently used (LRU) indication when a new system memory address is to be cached.

In one example of a method, the shared distributed metadata hosted by the metadata store comprises lock bits, valid bits, and dirty bits.

In one example of a method, locking the valid bits and dirty bits of a given cache controller via a lock bit indicating that the valid bits and dirty bits of the given cache controller are not be changed except by the given cache controller.

In one example of a method, upon completion of relevant transactions at a given cache controller, updating the appropriate metadata store of appropriate valid bits and dirty bits and cause a lock bit to be cleared.

What is claimed is:

1. A memory system, comprising:
multiple interleaved cache controllers with circuitry configured to:
access memory controllers which access memory;
a metadata store serving the multiple interleaved cache controllers, the metadata store to:
receive information from a plurality of the multiple interleaved cache controllers, a portion of which is stored as shared distributed metadata such that a particular shared metadata entry includes information from more than one interleaved cache controller;
provide shared access of the shared distributed metadata hosted to the multiple interleaved cache controllers; and
a metadata store fabric disposed between the multiple interleaved cache controllers and the metadata store to facilitate the shared access, the metadata store fabric having a mesh structure.

2. The memory system of claim 1, wherein the information is related to a task assigned to one of the multiple interleaved cache controllers.

3. The memory system of claim 2, wherein the metadata store fabric further comprises a common logic block to manage the task.

4. The memory system of claim 2, wherein the metadata store further comprises a logic block to manage the task.

5. The memory system of claim 1, wherein the metadata store is one of a plurality of metadata stores.

6. The memory system of claim 1, wherein the metadata store is one of a plurality of metadata stores and the number of the plurality of metadata stores is less than the number of the multiple interleaved cache controllers.

7. The memory system of claim 1, wherein the metadata store is one of a plurality of metadata stores and the number of the plurality of metadata stores is greater than the number of the multiple interleaved cache controllers.

8. The memory system of claim 1, wherein the metadata store is a static random-access memory (SRAM) array.

9. The memory system of claim 1, wherein one of the tasks assigned to the metadata store comprises maintaining least recently used (LRU) indications.

10. The memory system of claim 1, wherein one of the tasks assigned to the metadata store comprises re-allocating an entry based on the least recently used (LRU) indication when a new system memory address is to be cached.

11. The memory system of claim 1, wherein the shared distributed metadata hosted by the metadata store comprises valid bits and dirty bits.

12. The memory system of claim 1, wherein the shared distributed metadata hosted by the metadata store comprises lock bits pertaining to the multiple interleaved cache controllers.

13. The memory system of claim 12, wherein a lock bit is to assert that the valid bits and dirty bits of a given cache controller are locked and are not changed except by the given cache controller.

14. The memory system of claim 1, wherein one of the multiple interleaved cache controllers, upon completion of all transactions relating to a metadata entry, is to update the metadata store of appropriate valid bits and dirty bits and cause a lock bit to be cleared.

15. The memory system of claim 14, wherein a logic block is configured to identify dirty entries for a scrubbing operation wherein the logic block is associated with the metadata store fabric or the metadata store.

16. A method, comprising:
receiving information at a metadata store from a plurality of a multiple of interleaved cache controllers;
storing the information as shared distributed metadata in the metadata store, wherein the multiple interleaved cache controllers and the metadata store are interconnected via a metadata store fabric and the metadata store fabric having a mesh structure and a particular shared metadata entry includes information from more than one interleaved cache controller;
providing shared access of the shared distributed metadata to the multiple interleaved cache controllers; and
assigning a task to be executed at a logic block, wherein the task operates on the shared distributed metadata.

17. The method of claim 16, wherein the metadata store is one of a plurality of metadata stores.

18. The method of claim 16, wherein the multiple interleaved cache controllers and a plurality of metadata stores are interconnected via a metadata store fabric that comprises the logic block, the logic block comprising a common logic block to manage metadata operations.

19. The method of claim 16, wherein the metadata store further comprises the logic block, the logic block comprising a logic block to manage metadata operations.

20. The method of claim 16, wherein the task assigned to the logic block comprises maintaining least recently used (LRU) indications.

21. The method of claim 16, wherein the task assigned to the logic block comprises re-allocating a clean entry with a higher least recently used (LRU) indication when a new system memory address is to be cached.

22. The method of claim 16, wherein the shared distributed metadata hosted by the metadata store comprises tag bits, valid bits, and dirty bits.

23. The method of claim 22, further comprising:
locking the valid bits and dirty bits of a given cache controller via a lock bit indicating that the valid bits and dirty bits of the given cache controller are not to be changed except by the given cache controller.

24. The method of claim 16, further comprising:
upon completion of relevant transactions at a given cache controller, updating an appropriate metadata store of appropriate valid bits and dirty bits and causing a lock bit to be cleared.

* * * * *